(12) United States Patent
Bettencourt-Silva et al.

(10) Patent No.: US 11,443,215 B2
(45) Date of Patent: Sep. 13, 2022

(54) INTELLIGENT RECOMMENDATION OF CONVENIENT EVENT OPPORTUNITIES

(71) Applicant: INTERNATIONAL BUSINESS MACHINES CORPORATION, Armonk, NY (US)

(72) Inventors: Joao H. Bettencourt-Silva, Dublin (IE); Theodora Brisimi, Dublin (IE); Marco Luca Sbodio, Castaheany (IE); Natalia Mulligan, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 686 days.

(21) Appl. No.: 16/180,699

(22) Filed: Nov. 5, 2018

(65) Prior Publication Data
US 2020/0143273 A1    May 7, 2020

(51) Int. Cl.
*G06N 5/04*     (2006.01)
*G06N 20/00*    (2019.01)

(52) U.S. Cl.
CPC ............ *G06N 5/048* (2013.01); *G06N 20/00* (2019.01)

(58) Field of Classification Search
None
See application file for complete search history.

(56) References Cited

U.S. PATENT DOCUMENTS

| 2009/0100037 | A1  | 4/2009  | Scheibe |
| 2013/0080204 | A1  | 3/2013  | Khorashadi et al. |
| 2013/0297692 | A1* | 11/2013 | Raji ................. H04W 4/21 709/204 |
| 2014/0108307 | A1* | 4/2014  | Raghunathan ......... G06N 20/00 706/12 |
| 2016/0084664 | A1  | 3/2016  | Margalit et al. |
| 2016/0371372 | A1* | 12/2016 | Chong .................. H04H 60/33 |
| 2017/0122756 | A1  | 5/2017  | Chen et al. |

OTHER PUBLICATIONS

Kesorn, "Personalized Attraction Recommendation System for Tourists Through Check-In Data", 2017 (Year: 2017).*
Elinat Minkov, "Collaborative Future Event Recommendation", 2010 (Year: 2010).*

* cited by examiner

*Primary Examiner* — Ann J Lo
*Assistant Examiner* — Van C Mang
(74) *Attorney, Agent, or Firm* — Griffiths & Seaton PLLC

(57) ABSTRACT

Embodiments for implementing intelligent recommendations of convenient event opportunities by a processor. A group of entities may be identified for one or more event opportunities or the one or more event opportunities may be identified for the group of entities according to one or more entity selection criteria and one or more event criteria. The one or more event opportunities and the group of entities may be matched according to a level of convenience for attending the one or more event opportunities of the group of entities. The one or more matching event opportunities may be ranked and suggested to the group of entities.

17 Claims, 7 Drawing Sheets

INTELLIGENT RECOMMENDATION OF CONVENIENT EVENT OPPORTUNITIES

BACKGROUND OF THE INVENTION

Field of the Invention

The present invention relates in general to computing systems, and more particularly to, various embodiments for implementing intelligent recommendations of convenient event opportunities by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. For example, many individuals require extensive use of technology relating to social interaction and relationship development. Computing systems can include an Internet of Things (IoT), which is the interconnection of computing devices scattered across the globe using the existing Internet infrastructure. IoT devices may be embedded in a variety of physical devices or products. As great strides and advances in technologies come to fruition, these technological advances can be then brought to bear in everyday life. For example, the vast amount of available data made possible by computing and networking technologies may then assist in improvements to quality of life and social interaction and relationship development.

SUMMARY OF THE INVENTION

Various embodiments for implementing intelligent recommendations of convenient event opportunities using one or more processors, are provided. In one embodiment, by way of example only, a method for implementing intelligent recommendations of convenient event opportunities, again by a processor, is provided. A group of entities may be identified for one or more event opportunities according to one or more entity selection criteria and one or more event criteria. The one or more event opportunities and the group of entities may be matched according to a level of convenience for attending the one or more event opportunities of the group of entities. The one or more matching event opportunities may be suggested to the group of entities.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
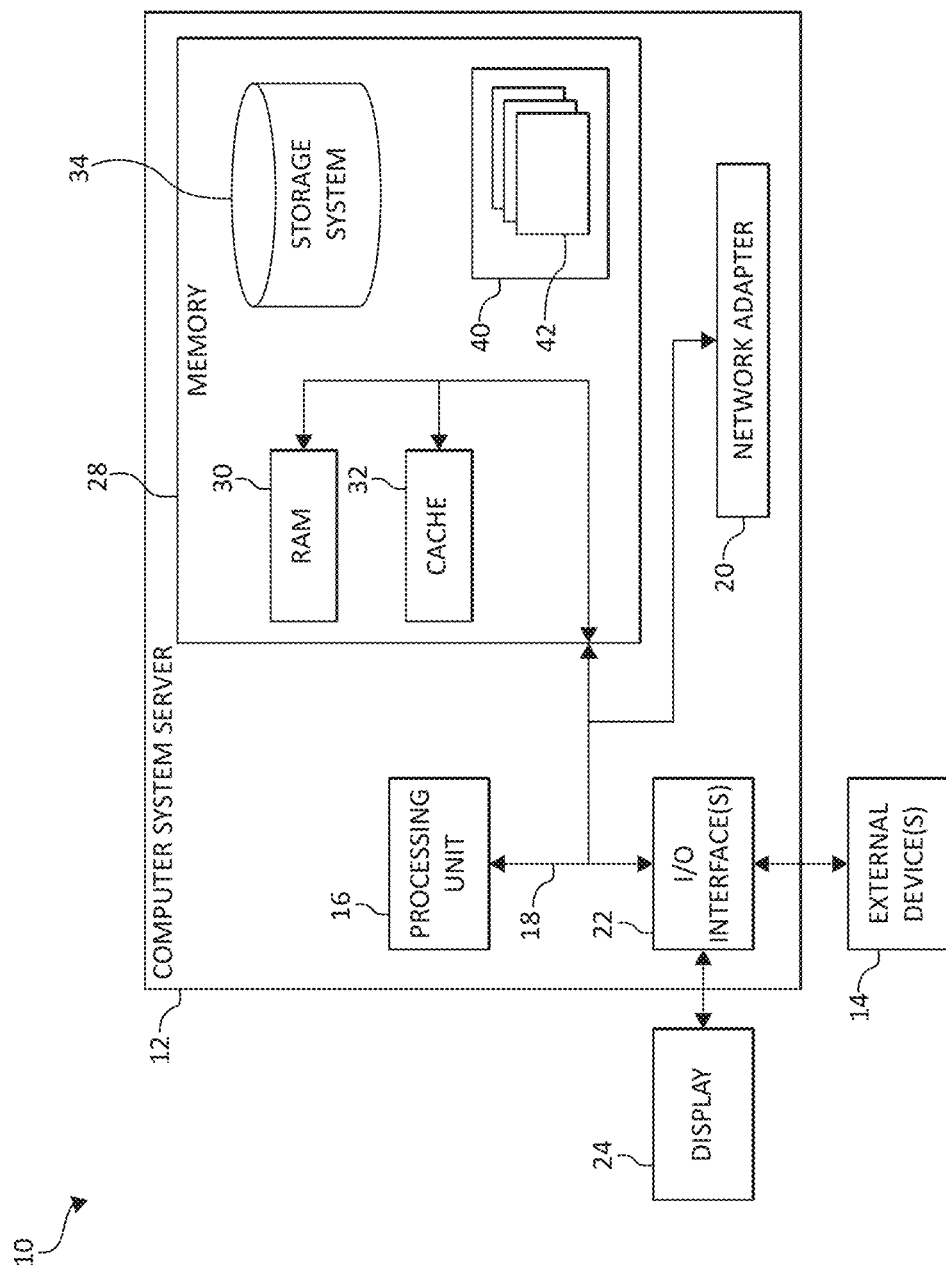
FIG. 1 is a block diagram depicting an exemplary computing node according to an embodiment of the present invention.

Computing systems may include large scale computing called "cloud computing," in which resources may interact and/or be accessed via a communication system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

The prolific increase in use of IoT appliances in computing systems, particularly within the cloud computing environment, in a variety of settings provide various beneficial uses for developing and maintaining social relationships.

Accordingly, the present invention provides a cognitive system for automatically implementing intelligent recommendations of convenient event opportunities. One or more event opportunities may be identified according to one or more event criteria for a selected group of entities identified according to one or more entity selection criteria. The one or more event opportunities may be suggested according to a level of convenience for attending the one or more event opportunities of the selected group of entities. In one aspect, an entity may be a person and a group of entities (e.g., a group of friends) may be individuals who have some connection among themselves (e.g., socially connected), and the group of entities can be manually specified or automatically identified (e.g., identified from one or more online data sources such as, for example, a social network).

Also, an event opportunity is more than just an event or meeting. The event opportunity is meeting opportunity that is an assembly of people (e.g., friends) for discussion or entertainment and also includes one or more associated activities, preferences, and/or travel arrangements associated with an event based on a level of convenience. For example, an event opportunity may include 1) identifying a group of entities that like a type of music (e.g., jazz music), 2) identifying one or more music events (e.g., a jazz festival), 3) identify one or more opportunities for traveling to the music event (e.g., a least cost route, shortest distances, etc.) for each identified person of the group of entities, and/or 4) identify one or more locations (e.g., hotel) for any overnight stay suitable for all friends (if necessary) during the identified music event.

For example, the present invention targets the current challenge of suggesting event/meeting opportunities tailored to a group of entities/friends who may be geographically distributed and already know each other. Thus, various mechanisms of the illustrate embodiments identify and suggests a ranked list of event opportunities to a group of entities to spend time together. The group of entities may be identified based on a set of criteria (e.g., closely connected or a group in a social media network such as, friends, family, colleagues, or other persons socially connected in a social media network). The suggested event opportunities may be identified based on a set of criteria (e.g., the system considers the geographic location of the friends in the group, interests of each member of the group, and the cost (e.g., a minimized cost) associated with a proposed event/meeting opportunity solution).

In one aspect, the present invention progressively refines the suggested opportunities by considering feedback from one or more entities, a machine learning operation, or a combination thereof. The feedback may include approvals, rejections, and/or rankings of the ranked and convenient event opportunities. A machine learning mechanism may use historical input and/or feedback information to build a suggested opportunities models.

In one aspect, the feedback data may also be collected from one or more IoT devices or sensors such as, for example, smart phones, wearable devices or sensors, cameras, radio frequency identification "RFID" readers, biometric sensors, computers, handheld devices (e.g., Global Positioning System "GPS" device or step counters), smart phones, and/or other sensor based devices.

Additionally, the present invention provides for automatically implementing intelligent recommendations of convenient event opportunities by learning the activities of daily living ("ADLs") for each entity (e.g., person) and may refer to the most common activities that people perform during a day. For example, ADLs may include many activities that take place throughout the day, particularly going to work, health/fitness management, communication management, financial management, safety/emergency responses, traveling/vacationing, hobbies, shopping, visiting friends or family, traveling, housekeeping, grooming or personal hygiene practices, meal preparation/dining out, engaging in social media, and even using a computer. The context of daily living ("CDL" or "CDLs") may also be learned and identified and refer to the context in which one or more ADLs are executed or carried out. The CDL may also include one or more dimensions such as, for example, time, location, environment conditions, weather conditions, traffic conditions, and the like.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
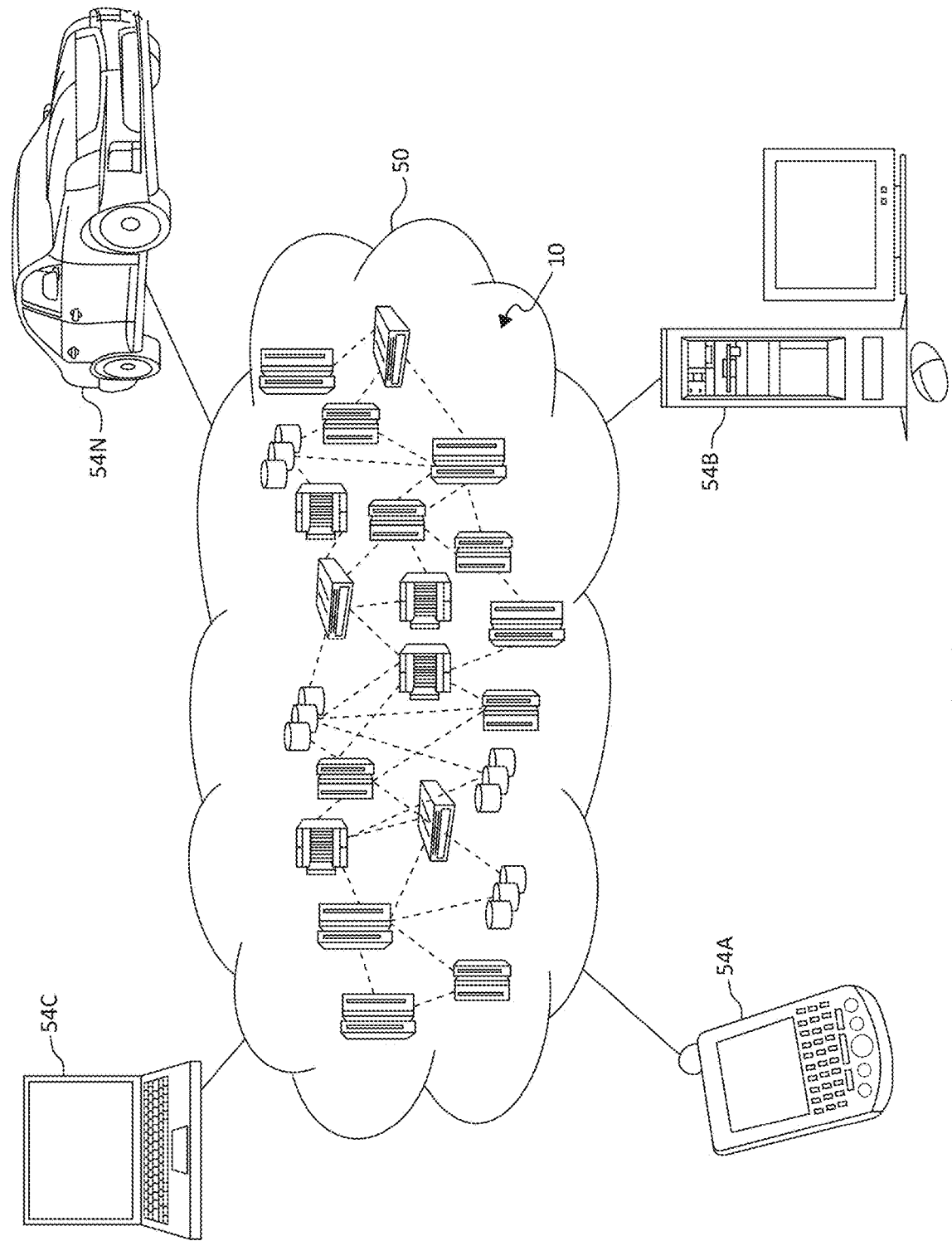
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, smart phone/smart watch/cellular telephone 54A, desktop computer 54B, laptop computer 54C, and/or other IoT computer devices/computer system 54N. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
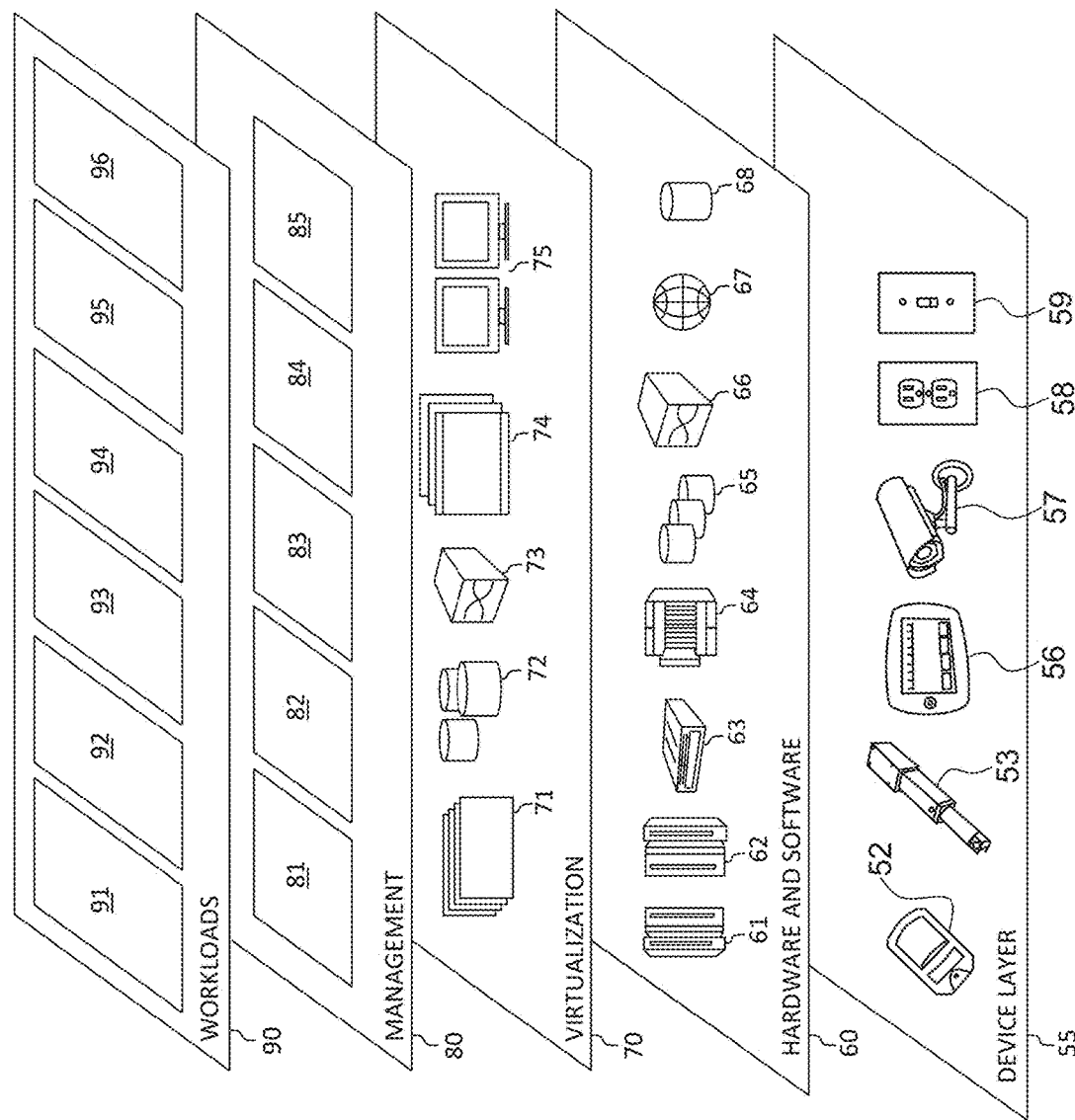
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent recommendations of convenient event opportunities. In addition, workloads and functions 96 for intelligent recommendations of convenient event opportunities may include such operations as data analytics, data analysis, and as will be further described, notification functionality. One of ordinary skill in the art will appreciate that the workloads and functions 96 for intelligent recommendations of convenient event opportunities may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the intelligent recommendations of convenient event opportunities to a user using one or more processors. The intelligent recommendations of convenient event opportunities service may automatically identify and suggest convenient event opportunities for a group of entities. A set of criteria may be used to identify a group of entities, and a set of criteria may be used to identify the event opportunities. All of the event opportunities may be ranked and suggested to the group of entities based on convenience criteria. In one aspect, convenience may also be defined as suitable, easy, favorable, advantageous, expedient, appropriate, requiring a least amount of time and/or effort, and/or agreeable to the needs, purposes, interests, preferences of the group of entities (e.g., group of friends). Event opportunities may be determined as convenient options for a group of entities to spend time together, where convenience is a quantifiable feature optimized, based on a set of criteria. The sets of criteria may be used to identify a group of entities, event opportunities, and/or the convenience criteria can be configured or learned from data. Ranking and suggesting the event opportunities may be performed either pro-actively or on demand.

Figure 4:
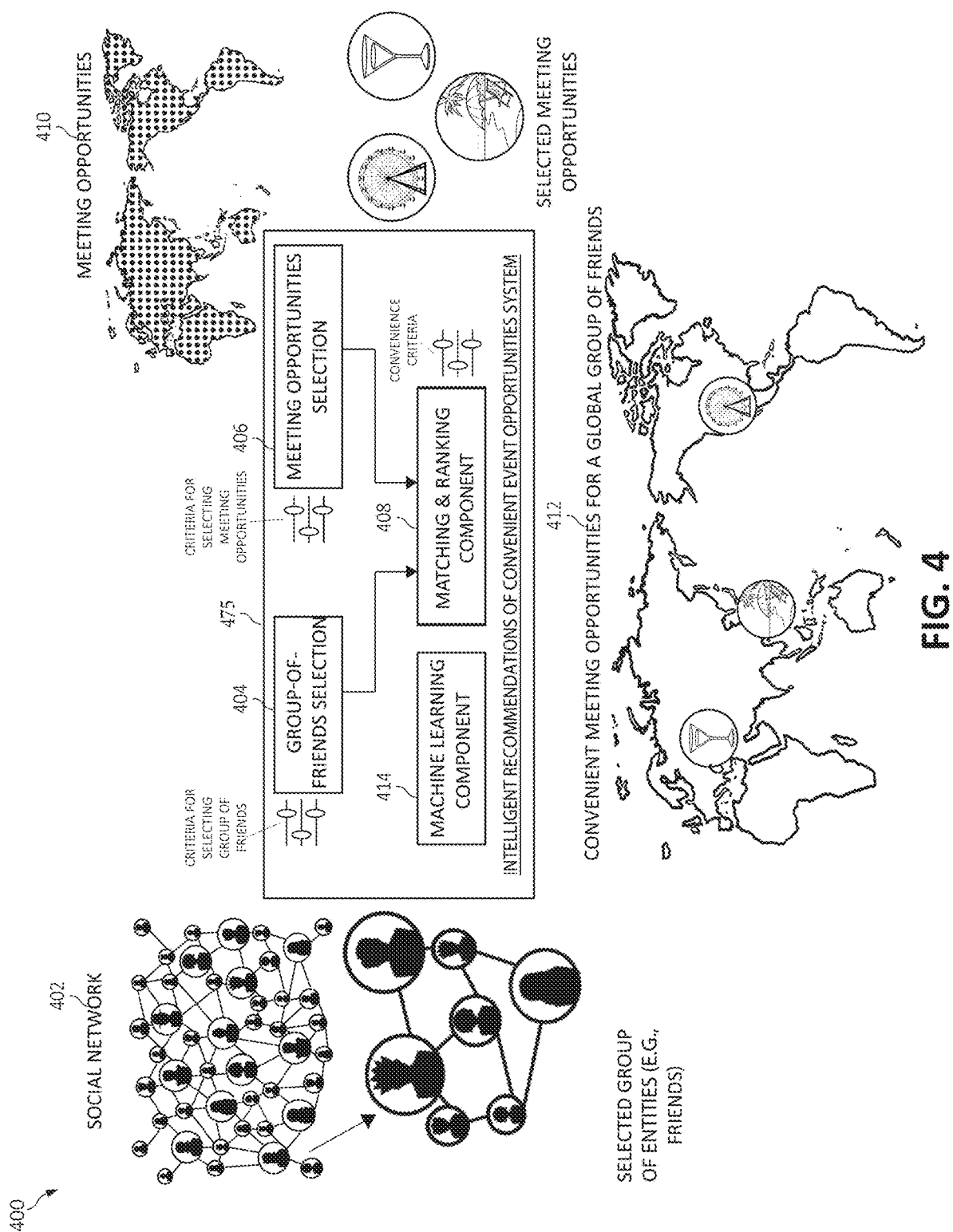
FIG. 4 is an additional block diagram depicting an exemplary functional relationship between various aspects of the present invention.

Turning now to FIG. 4, a block diagram depicting exemplary functional components of computing environment 400 according to various mechanisms of the illustrated embodiments is shown. FIG. 4 illustrates intelligent recommendations of convenient event opportunities workloads and functions in a computing environment, such as a computing environment 400, according to an example of the present technology. As will be seen, many of the functional blocks may also be considered "modules" or "components" of functionality, in the same descriptive sense as has been previously described in FIGS. 1-3.

With the foregoing in mind, the module/component blocks of computing system 400 may also be incorporated into various hardware and software components of a system for intelligent recommendations of convenient event opportunities in accordance with the present invention. Many of the functional blocks 400 may execute as background processes on various components, either in distributed computing components, or on the user device, or elsewhere.

The computing system 400 may include an intelligent recommendations of convenient event opportunities system 475. The intelligent recommendations of convenient event opportunities system 475 may include a set of entities selection component 404 (e.g., "group-of-friends selection"), event opportunities selection component 406 (e.g., event opportunities selection), a matching and ranking component 408, and a machine learning component 414. The intelligent recommendations of convenient event opportunities system 475 may also be in communication with data source 402 (e.g., a social network) and/or data source 410 (e.g., one or more IoT devices such as, for example, a smart phone/smart watch/cellular telephone 54A, desktop computer 54B, laptop computer 54C, and/or other IoT computer devices/computer system 54N of FIG. 1), and/or one or more other data sources (e.g., online data sources). In one aspect, data sources that may be accessed to identify one or more event opportunities (e.g., event opportunities).

Multiple data sources 402 and/or 410 may be provided as a corpus or group of data sources defined and/or requested by a user. The data sources 402 and/or 410 may include, but are not limited to, data sources relating to one or more documents, materials related to social media networks, biographies, books, online journals, journals, articles, newspapers, and/or other various documents or data sources capable of being published or displayed. The data sources 402 and/or 410 may be all of the same type, for example, pages or articles in a wiki or pages of a blog. Alternatively, the data sources 402 and/or 410 may be of different types, such as word documents, wikis, web pages, power points, printable document format, or any document capable of being analyzed by a natural language processing system. The group of data sources 402 and/or 410 are consumed using natural language processing (NLP) and artificial intelligence (AI) to provide processed content. The data sources 402 and/or 410 may be analyzed to data mine the relevant from content of the data sources 402 and/or 410 (e.g., methods and features extracted from mined internet web pages, social media networks, calendar systems, or documents) in order to display the information in a more usable manner and/or provide the information in a more searchable manner. That is, the data gathered from one or more internet of things (IoT) devices and/or data sources may be parsed for identifying one or more event opportunities and the selected group of entities. The machine learning component 414 may provide the NLP and AI services. These NLP and AI services may include, for example, IBM® Watson®, which may be provided as a cloud service or as a local service (IBM® and Watson® are trademarks of International Business Machines Corporation).

In one aspect, the intelligent recommendations of convenient event opportunities system 475 may provide virtualized computing services (i.e., virtualized computing, virtualized storage, virtualized networking, etc.). More specifically, the intelligent recommendations of convenient event opportunities system 475 may provide virtualized computing, virtualized storage, virtualized networking and other virtualized services that are executing on a hardware substrate.

In one aspect, the set of entities selection component 404 ("group-of-friends selection" component) may define the one or more entity selection criteria to include an entity profile, similarity features and characteristics among a plurality of entities, similar interests, a type of connection, ADLs, historical data of each of the plurality of entities, calendar data, frequency of attended historical events, a selected amount of time between events, or a combination thereof.

The event opportunities selection component 406 (e.g., "event opportunities selection" component) may define the one or more selected criteria according to location, venue, travel options, time, financial costs, common interests, topics, meeting history, entity preferences, activity type, or a combination thereof. That is, the event opportunities selection component 406 may cognitively identify one or more event opportunities according to one or more event criteria for a selected group of entities identified via the set of entities selection component 404 according to one or more entity selection criteria.

The matching and ranking component 408 may match one or more event opportunities with a selected group of entities identified according to one or more entity selection criteria. The matching and ranking component 408 may rank the one or more event opportunities according to the level of convenience. Those of the ranked one or more event opportunities having a level of convenience greater than a defined threshold may be suggested. That is, the matching and ranking component 408 may cognitively suggest the one or more event opportunities according to a level of convenience (e.g., less travel time, less cost, greater amount of time allocated for the opportunity) for attending the one or more event opportunities of the selected group of entities.

The machine learning component 414 may learn, identify, or recommend the one or more one or more event opportunities, the one or more entity selection criteria, and the selected group of entities.

In one aspect, machine learning operation may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

In one aspect, the intelligent recommendations of convenient event opportunities system 475 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.) Thus, as used herein, a calculation operation may include all or part of the one or more mathematical operations.

With the foregoing functional components 400 in view, consider some of the various aspects of the illustrated embodiments.

For a group of entities (e.g., former school mates) having failed to maintain contact or visit with each other for some time and are located in different countries (e.g., country A, B, and C), the intelligent recommendations of convenient event opportunities system 475 may proactively and/or on-demand suggests to the group of entities to spend a weekend in country D based on different criteria such as, for example country D being an interesting location based on the information from each of the friends social media feed, social media profiles, history of previous activities, calendar availability, costs for the event/transportation (e.g., plane ticket prices as identified in online search engines, gas and/or toll fee for driving), accommodation (as identified by hotel prices in search engines, etc.) and restaurants (restaurant menu prices as identified in a consumer review website, etc.).

In an additional example, for a group of entities who routinely attend music events (e.g., regularly attend Jazz concerts), the intelligent recommendations of convenient event opportunities system 475 may proactively and/or on-demand suggest going to an alternative event such as, for example, "XYZ" Jazz festival. The opportunity may be selected based on, for example, each of the members of the group of entities interest in Jazz as identified from one or more social media feed, social media profiles, history of previous activities, calendar availability, information about the XYZ Jazz festival, including dates, cost, location. For example, the intelligent recommendations of convenient event opportunities system 475 may identify a Jazz festival that is located within a defined distance from a user and located an airline flight at a selected time to have dinner at a restaurant X based on the level of convenience (e.g., "a Jazz festival at a bargain deal is identified, and not far from you and a group of your friends. Please take a 45 minute flight on airline X on Friday to arrive early enough to have dinner at 5:00 p.m. at restaurant X in order to arrive 30 minutes early to the Jazz festival").

For two friends located in city A and city B (two neighborhoods of country E), the intelligent recommendations of convenient event opportunities system 475 may proactively and/or on-demand suggest a ranked list of places to meet (which may include restaurants for dining, taverns/clubs for social activities and/or live music etc.). The list may be ranked based on, for example, a most recent time (e.g., the last time) each of the group of members visited the place (if the two friends have never visited/frequented the place, the location may be ranked first), preferences/taste as identified from one or more social media feed, social media profiles, history of previous activities, calendar availability.

Figure 5:
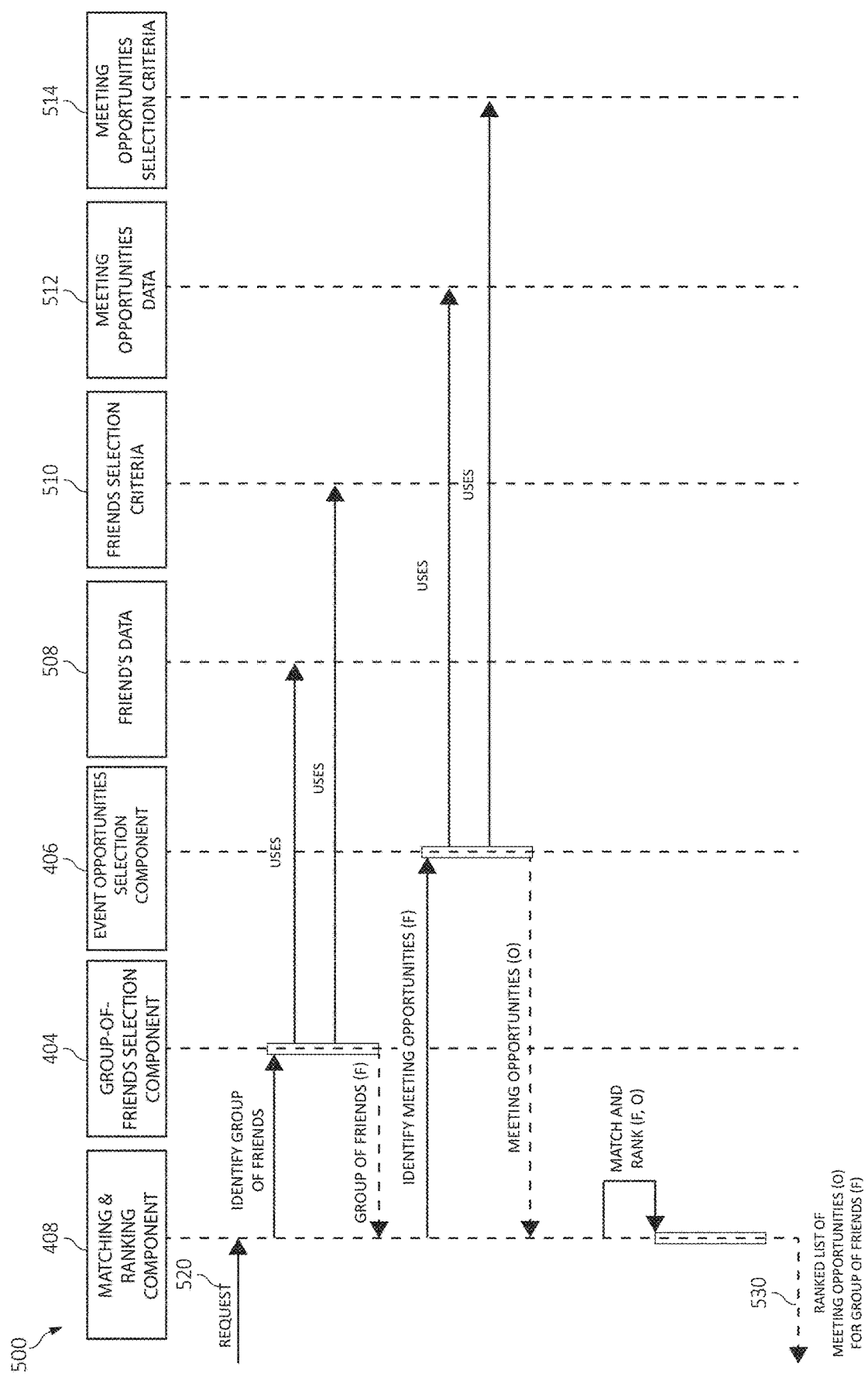
FIG. 5 is a block-flow diagram depicting an additional exemplary method for implementing intelligent recommendations of convenient event opportunities in which aspects of the present invention may be realized.

Turning now to FIG. 5, a block diagram of exemplary functionality 500 of implementing intelligent recommendations of convenient event opportunities is depicted. It should be noted that the implementing intelligent recommendations of convenient event opportunities system 475 of FIG. 4 may be included in and/or associated with computer system/server 12 of FIG. 1, incorporating one or more processing unit(s) 16 to perform various computational, data processing and other functionality in accordance with various aspects of the present invention. For example, functionality 500 of the intelligent recommendations of convenient event opportunities system 475 is illustrated using the matching and ranking component 408, the group of entities selection component 404, the event opportunities selection component 406 (e.g., event opportunities selection), friend's data 508, entity (e.g., friends) selection criteria 510, event opportunities data 512, and/or event/meeting opportunities selection criteria 514.

As shown, the various blocks of functionality are depicted with arrows designating the blocks' 500 relationships with each other and to show process flow of the implementing intelligent recommendations of convenient event opportunities system 475. Additionally, descriptive information is also seen relating each of the functional blocks 500. As will be seen, many of the functional blocks may also be considered "modules" or "components" of functionality, in the same descriptive sense as has been previously described in FIGS. 1-5. With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere, and generally unaware to the user performing generalized tasks of the present invention.

Starting input 520, a request may be received by the matching and ranking component 408. The group of entities selection component 404 may identify a group of entities (F) using a set of criteria (CF) 510 (e.g., friends selection criteria) and/or friend's data 508.

In one aspect, the group of entities selection component 404 may receive as input, the friend's data 508, a set of criteria (CF) 510 for identifying a group of entities (F) (e.g., friend's selection criteria). In one embodiment, the set of criteria (CF) 510 consists of rules that may include, for example, selecting friends with similar features (e.g., based on some similarity metric), features may include common interests, type of connection (for example family members, or schoolmates, or co-workers, etc.). Also, the set of criteria (CF) 510 consists of rules may include selecting friends having a relevant meeting history such as, for example, friends who have not met up recently but have met in the past (e.g., more than 6 months previously) but, friends who have failed to have contact for a selected amount of time, friends who meet regularly, etc.

In an additional aspect, learning the set of criteria (CF) 510 may be based on historical data that may include, for example, historical friend's data, historical data about previous friends' meetings, including the type of the meeting, location, time, and tags (e.g., named entities) or other features characterizing the meeting event. The output 530 may be a group of entities (F) with related features characterizing their profiles and their meeting history.

The event opportunities selection component 406 (e.g., event opportunities selection component) may then identify a set of event opportunities (O) using the selected group of entities (F), a set of criteria (CO) for selecting event/meeting opportunities 512 and/or, event/meeting opportunities selection criteria 514. The event opportunities selection component 406 may receive as input, the data about a selected group of entities (F) (e.g., output of "Group-of-friends selection component"), data about event opportunities, and/or a set of criteria (CO) for identifying event opportunities.

In one aspect, the set of criteria (CO) may include of rules that may include, for example, selecting events with similar features (based on some similarity metric); features may include common type or topic, shared tags (named entities), location, venue, time, cost (e.g., a minimized cost or bargain/sale), attendees, etc., and/or electing events with similar features to events previously attended by friends in F, where similarity is based on a variety of features that may include common type or topic, shared tags (named entities), location, venue, time, cost, attendees, etc. In an additional embodiment, learning the set of criteria (CO) based on historical data that may include, for example, historical data on event opportunities, historical data about previous meetings of friends in F. The output of the event opportunities selection component 406 may include a list of event opportunities with corresponding features.

The matching and ranking component 408 may then rank the selected event opportunities (O) to maximize convenience for the group of entities (F). That is, the matching and ranking component 408 may be provided a ranked list of event opportunities (O) for a group of entities (F) as output 530. That is, the matching and ranking component 408 may receive as inputs, for example, the selected group of entities (F), the selected event opportunities (O), and/or convenience optimization criteria (CC). In one aspect, the convenience optimization criteria (CC) may include a set of rules, which optimize one or more features from the selected group of entities (F) and the selected event opportunities (O). For example, the set of rules may include for example: minimized travel time for friends in the selected group of entities (F), minimized costs of meeting opportunity in the selected event opportunities (O), maximize one or more common interests for friends in the selected group of entities (F) to attend a meeting opportunity in the selected event opportunities (O). The common interests may be specified by tags (e.g., named entities) and measured with a similarity metric (e.g., using a Jaccard index).

In one aspect, the convenience optimization criteria (CC) may be learned based on historical data with features characterizing past meeting among group of entities, which may include friend's data 508 and event opportunities data 512 (e.g., event opportunities data). In one aspect, one or more operations may use learning to rank techniques to learn a ranking model corresponding to the convenience optimization criteria (CC). Thus, the output 530 may be the ranked list of recommended event opportunities (RO) with corresponding features. Also, the recommendations may be determined and/or computed using collaborative filtering and/or re-ranked based on the convenience optimization criteria (CC).

In one aspect, the friend's data 508 may include information about social media friends, friend's connections, and one or more types of connections (e.g., family members, or schoolmates, co-workers, known associates, etc.). The friends' profiles may include gender, age, location, preferences (e.g., hobbies, tastes, interests, etc.), tags (named entities), and/or other features characterizing a friend. Also, a friend's location and schedule (calendar information) may also be provided.

In one aspect, the event opportunities data 512 may include information about a type or topic of the event tags (e.g., named entities) or other features characterizing the meeting event, location and venue, date and time, travel options, accommodation options, and/or cost.

Figure 6:
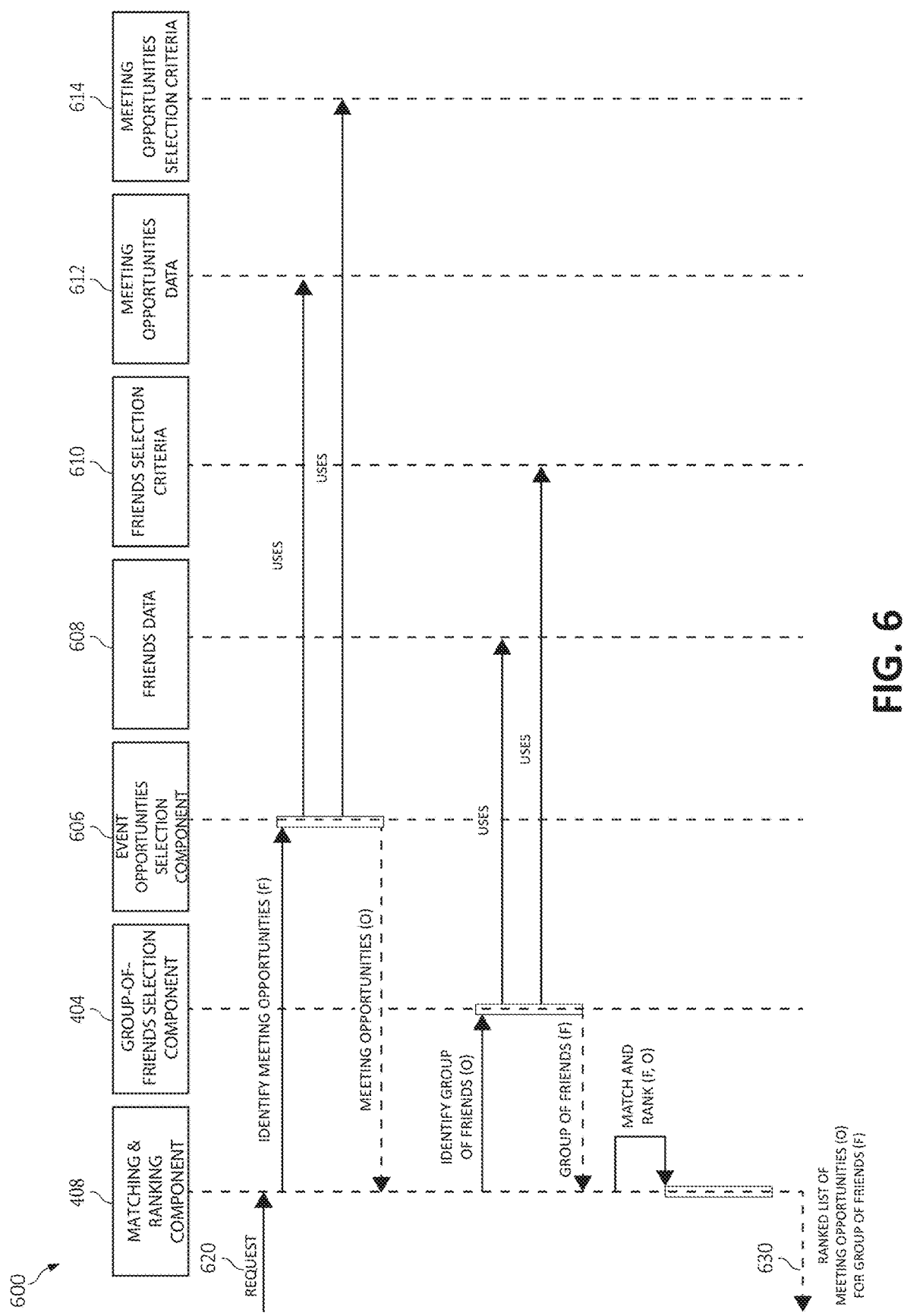
FIG. 6 is a block-flow diagram depicting an additional exemplary method for implementing intelligent recommendations of convenient event opportunities in which aspects of the present invention may be realized.

Turning now to FIG. 6, a block diagram of exemplary functionality 500 of implementing intelligent recommendations of convenient event opportunities is depicted. It should be noted that the implementing intelligent recommendations of convenient event opportunities system 475 may be included in and/or associated with computer system/server 12 of FIG. 1, incorporating one or more processing unit(s) 16 to perform various computational, data processing and other functionality in accordance with various aspects of the present invention. For example, functionality 600 of the intelligent recommendations of convenient event opportunities system 475 is illustrated using the matching and ranking component 408, the group of entities selection component 404, the event opportunities selection component 406 (e.g., event opportunities selection), friend's data 508, entity (e.g., friends) selection criteria 510, and/or event opportunities data 512.

As shown, the various blocks of functionality are depicted with arrows designating the blocks' 600 relationships with each other and to show process flow of the implementing intelligent recommendations of convenient event opportunities system 475. Additionally, descriptive information is also seen relating each of the functional blocks 600. As will be seen, many of the functional blocks may also be considered "modules" or "components" of functionality, in the same descriptive sense as has been previously described in FIGS. 1-5. With the foregoing in mind, the module blocks 500 may also be incorporated into various hardware and software components of a system for image enhancement in accordance with the present invention. Many of the functional blocks 600 may execute as background processes on various components, either in distributed computing components, or on the user device, or elsewhere, and generally unaware to the user performing generalized tasks of the present invention.

Starting input 620, a request may be received by the matching and ranking component 408. The event opportunities selection component 406 (e.g., event opportunities selection component) may identify a set of event opportunities (O) using the selected group of entities (F), a set of criteria (CO) for selecting event/event opportunities 612 and/or, event/event opportunities data 614.

The group of entities selection component 404 (group-of-friends selection component) may identify a group of entities (F) using the selected event opportunities (O), a set of criteria (CF) 610 (e.g., friends selection criteria) and/or friend's data 608. The matching and ranking component 408 may rank the selected event opportunities (O) to maximize convenience for the group of entities (F). The output 630 may the ranked list of event opportunities (O) for the group of entities (F).

Other features and functionalities of the friend's data 608, the event opportunities data 612, the event opportunities selection component 406, the group of entities selection component 404, and the matching and ranking component 408 as described in FIG. 5 may be similarly implemented in FIG. 6. However, the inputs for the event opportunities selection component 406 does not include the selected group of entities (F) (e.g., the group of friend's "F" are unavailable. Also, the group of entities selection component 404 also includes the selected event opportunities (O). Thus, as described herein, the present invention provides for identifying a group of existing friends, identifying event opportunities, and matching and ranking identified event opportunities based on convenience criteria for the identified group of entities.

Figure 7:
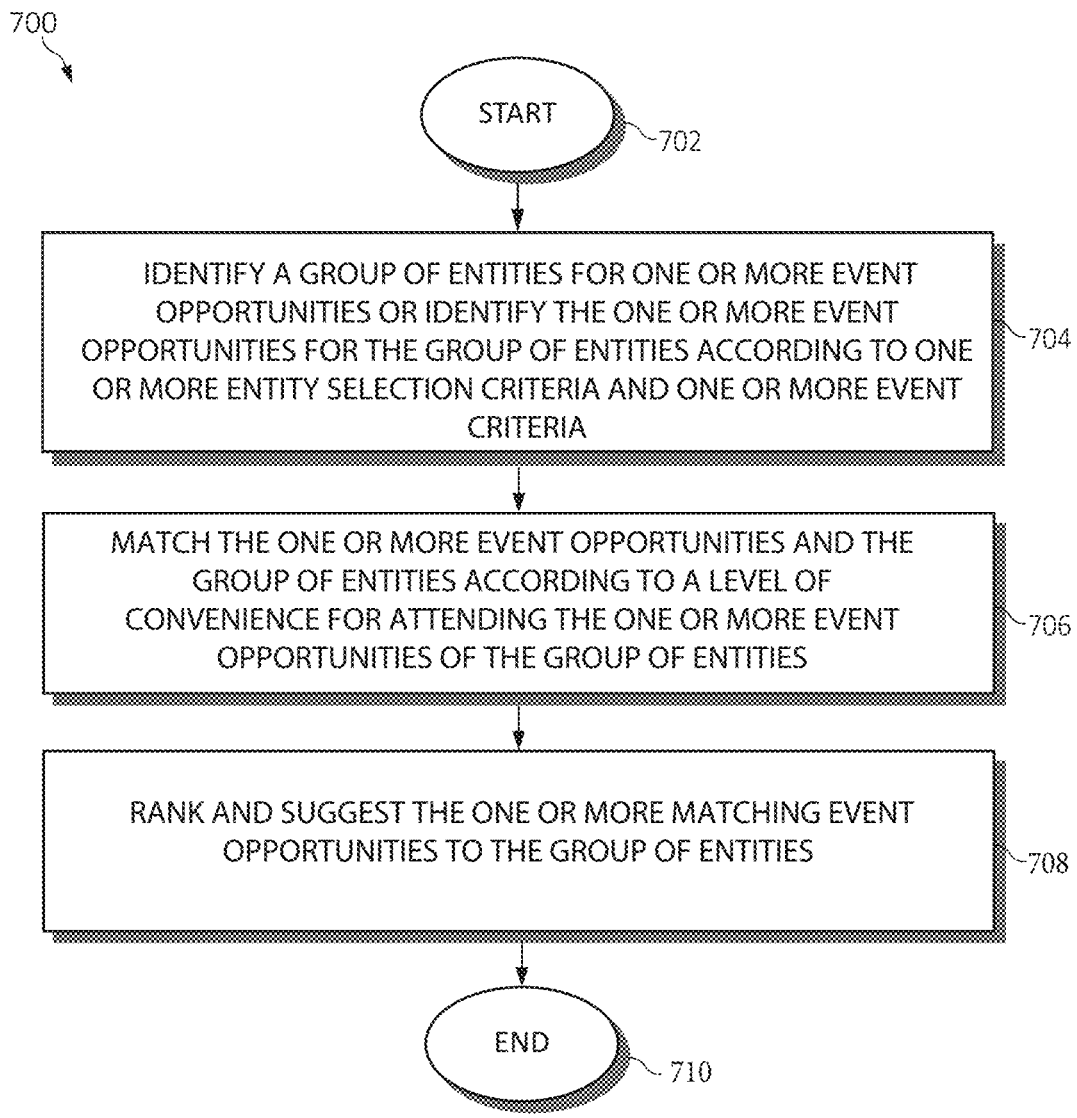
FIG. 7 is a flowchart diagram depicting an additional exemplary method for implementing intelligent recommendations of convenient event opportunities by a processor, again in which aspects of the present invention may be realized.

Turning now to FIG. 7, a method 700 for implementing intelligent recommendations of convenient event opportunities by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

A group of entities may be identified for one or more event opportunities or the one or more event opportunities may be identified for the group of entities according to one or more entity selection criteria and one or more event criteria, as in block 704. The one or more event opportunities and the group of entities may be matched according to a level of convenience for attending the one or more event opportunities of the group of entities, as in block 706. The one or more matching event opportunities may be ranked and suggested to the group of entities, as in block 708. The functionality 700 may end, as in block 710.

In one aspect, in conjunction with and/or as part of at least one block of FIG. 7, the operations of method 700 may include each of the following. The operations of method 700 may define the one or more entity selection criteria to include an entity profile, similarity features and characteristics among a plurality of entities, similar interests, a type of connection, historical data of each of the plurality of entities, calendar data, frequency of attended historical events, a selected amount of time between events, or a combination thereof, and/or define the one or more event criteria according to location, venue, travel options, time, costs (e.g., financial, time, energy, or the like such as, for example, least financially costly event opportunities and/or least amount of time cost, etc.) common interests, topics, meeting history, entity preferences, activity type, or a combination thereof. The operations of method 700 may rank the one or more event opportunities according to the level of convenience and suggest those of the ranked one or more event opportunities having the level of convenience greater than a defined threshold.

The operations of method 700 may machine learning mechanism to learn, identify, or recommend the one or more event opportunities, the one or more entity selection criteria, and the selected group of entities. Additionally, the operations of method 700 may parse data gathered from one or more internet of things (IoT) devices for identifying one or more event opportunities and the selected group of entities.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing intelligent recommendations of convenient event opportunities by a processor, comprising:
   identifying a group of entities for one or more event opportunities or identifying the one or more event opportunities for the group of entities according to one or more entity selection criteria and one or more event criteria;
   executing machine learning logic to train, in a first stage, a suggested opportunity model using observed behavior, inclusive of activities of daily living (ADL), of each entity in the group of entities as input;
   matching, based on the suggested opportunity model, the one or more event opportunities and the group of entities according to a level of convenience for attending the one or more event opportunities of the group of entities;
   ranking the one or more matching event opportunities according to the level of convenience;
   suggesting the ranked one or more matching event opportunities to the group of entities, wherein the one or more matching event opportunities each require at least one of the group of entities to perform and complete a plurality of actions in a predefined sequence to participate in a final event, and wherein suggesting the ranked one or more matching event opportunities includes suggesting scheduling arrangements for the at least one of the group of entities to perform the plurality of actions in the predefined sequence based on the level of convenience determined for each of the plurality of actions; and
   executing the machine learning logic to train, in a second stage, the suggested opportunity model using feedback data collected subsequent to suggesting the ranked one or more matching event opportunities, wherein the suggested opportunity model is iteratively updated using the feedback data to enhance an accuracy of future suggested event opportunities.

2. The method of claim 1, further including defining the one or more entity selection criteria to include at least an entity profile, features and characteristics common among a plurality of entities, same interests, a type of connection, historical data of each of the plurality of entities, calendar data, frequency of attended historical events, a selected amount of time between events, or a combination thereof.

3. The method of claim 1, further including defining the one or more event criteria to include at least a location, venue, travel options, time, financial costs, common interests, topics, meeting history, entity preferences, activity type, or a combination thereof.

4. The method of claim 1, further including suggesting those of the ranked one or more matching event opportunities having the level of convenience greater than a defined threshold.

5. The method of claim 1, further including initializing a machine learning mechanism to learn, identify, or recommend the one or more one or more matching event opportunities, the one or more entity selection criteria, and the group of entities.

6. The method of claim 1, further including parsing data gathered from one or more internet of things (IoT) devices for identifying one or more event opportunities and the selected group of entities.

7. A system for implementing intelligent recommendations of convenient event opportunities, comprising:
   one or more computers with executable instructions that when executed cause the system to:
   identify a group of entities for one or more event opportunities or identifying the one or more event opportunities for the group of entities according to one or more entity selection criteria and one or more event criteria;
   execute machine learning logic to train, in a first stage, a suggested opportunity model using observed behavior, inclusive of activities of daily living (ADL), of each entity in the group of entities as input;
   match, based on the suggested opportunity model, the one or more event opportunities and the group of entities according to a level of convenience for attending the one or more event opportunities of the group of entities;
   rank the one or more matching event opportunities according to the level of convenience;
   suggest the ranked one or more matching event opportunities to the group of entities, wherein the one or more matching event opportunities each require at least one of the group of entities to perform and complete a plurality of actions in a predefined sequence to participate in a final event, and wherein suggesting the ranked one or more matching event opportunities includes suggesting scheduling arrangements for the at least one of the group of entities to perform the plurality of actions in the predefined sequence based on the level of convenience determined for each of the plurality of actions; and
   execute the machine learning logic to train, in a second stage, the suggested opportunity model using feedback data collected subsequent to suggesting the ranked one or more matching event opportunities, wherein the suggested opportunity model is iteratively updated using the feedback data to enhance an accuracy of future suggested event opportunities.

8. The system of claim 7, wherein the executable instructions further define the one or more entity selection criteria to include at least an entity profile, features and characteristics common among a plurality of entities, same interests, a type of connection, historical data of each of the plurality of entities, calendar data, frequency of attended historical events, a selected amount of time between events, or a combination thereof.

9. The system of claim 7, wherein the executable instructions further define the one or more event criteria to include at least a location, venue, travel options, time, financial costs, common interests, topics, meeting history, entity preferences, activity type, or a combination thereof.

10. The system of claim 7, wherein the executable instructions further suggest of the ranked one or more matching event opportunities having the level of convenience greater than a defined threshold.

11. The system of claim 7, wherein the executable instructions further initialize a machine learning mechanism to learn, identify, or recommend the one or more one or more matching event opportunities, the one or more entity selection criteria, and the group of entities.

12. The system of claim 7, wherein the executable instructions further parse data gathered from one or more internet of things (IoT) devices for identifying one or more event opportunities and the selected group of entities.

13. A computer program product for implementing intelligent recommendations of convenient event opportunities by a processor, the computer program product comprising a non-transitory computer-readable storage medium having computer-readable program code portions stored therein, the computer-readable program code portions comprising:
   an executable portion that identifies a group of entities for one or more event opportunities or identifying the one or more event opportunities for the group of entities according to one or more entity selection criteria and one or more event criteria;
   an executable portion that executes machine learning logic to train, in a first stage, a suggested opportunity model using observed behavior, inclusive of activities of daily living (ADL), of each entity in the group of entities as input;
   an executable portion that matches, based on the suggested opportunity model, the one or more event opportunities and the group of entities according to a level of convenience for attending the one or more event opportunities of the group of entities;
   an executable portion that ranks the one or more matching event opportunities according to the level of convenience;
   an executable portion that suggests the ranked one or more matching event opportunities to the group of entities, wherein the one or more matching event opportunities each require at least one of the group of entities to perform and complete a plurality of actions in a predefined sequence to participate in a final event, and wherein suggesting the ranked one or more matching event opportunities includes suggesting scheduling arrangements for the at least one of the group of entities to perform the plurality of actions in the predefined sequence based on the level of convenience determined for each of the plurality of actions; and
   an executable portion that executes the machine learning logic to train, in a second stage, the suggested opportunity model using feedback data collected subsequent to suggesting the ranked one or more matching event opportunities, wherein the suggested opportunity model is iteratively updated using the feedback data to enhance an accuracy of future suggested event opportunities.

14. The computer program product of claim 13, further including an executable portion that:
   define the one or more entity selection criteria to include at least an entity profile, features and characteristics common among a plurality of entities, same interests, a type of connection, historical data of each of the plurality of entities, calendar data, frequency of attended historical events, a selected amount of time between events, or a combination thereof; and
   define the one or more selected criteria according to location, venue, travel options, time, financial costs, common interests, topics, meeting history, entity preferences, activity type, or a combination thereof.

15. The computer program product of claim 13, further including an executable portion that suggests those of the ranked one or more event opportunities having the level of convenience greater than a defined threshold.

16. The computer program product of claim 13, further including an executable portion that initializes a machine learning mechanism to learn, identify, or recommend the one or more one or more event opportunities, the one or more entity selection criteria, and the selected group of entities.

17. The computer program product of claim 13, further including an executable portion that parses data gathered from one or more internet of things (IoT) devices for identifying one or more event opportunities and the selected group of entities.

* * * * *